United States Patent [19]
Watkins et al.

[11] Patent Number: 5,850,426
[45] Date of Patent: Dec. 15, 1998

[54] REMOTE ACCESS TERMINAL

[75] Inventors: David L. Watkins, Wylie; Daniel L. Perkins, Mesquite; Peter F. Okon, Plano; Jon P. Coleman, Dallas, all of Tex.

[73] Assignee: MCI Communications Corporations, Washington, D.C.

[21] Appl. No.: 580,575

[22] Filed: Dec. 29, 1995

[51] Int. Cl.[6] .............................. H04M 1/24; H04M 3/08; H04M 3/22

[52] U.S. Cl. .................................. 379/29; 379/1; 379/9; 379/14; 379/32; 370/241

[58] Field of Search ............................... 379/25, 34, 112, 379/115, 116, 119, 121, 132, 133, 134, 196, 197, 201, 207, 220, 1, 9, 10, 15, 13, 14, 22, 32; 370/241, 250

[56] References Cited

U.S. PATENT DOCUMENTS

| | | | |
|---|---|---|---|
| 5,287,461 | 2/1994 | Moore | 395/275 |
| 5,333,183 | 7/1994 | Herbert | 379/112 |
| 5,459,777 | 10/1995 | Bassa et al. | 379/133 |
| 5,475,732 | 12/1995 | Pester, III | 379/34 |
| 5,611,052 | 3/1997 | Dykstra et al. | 395/238 |

FOREIGN PATENT DOCUMENTS

| | | |
|---|---|---|
| 0 412 692 A1 | 2/1991 | European Pat. Off. . |
| 0 535 270 A1 | 4/1993 | European Pat. Off. . |
| 2 582 177 A | 11/1986 | France . |

OTHER PUBLICATIONS

Electrical Communication, vol. 63, No. 1, Jun. 1989, pp.10–16, Romford, Essex, GB, W. Bohm et al., "Network Management".

Electrical Communication, vol. 58, No. 2, 1983, pp. 232–237, Brussels, BE, P.V. Heikkinen et al., "Central Office Maintenance System".

*Primary Examiner*—Curtis A. Kuntz
*Assistant Examiner*—Binh K. Tieu

[57] ABSTRACT

A cost-efficient process and system for the centralized monitoring and/or control of a telephone network. The centralized computer system maintains simultaneous and continuous communications links with a plurality of reporting computer systems that are each used to monitor and/or control at least a portion of a telephone network. A user can monitor and/or control the entire telephone network or any portion thereof from a single location at the centralized computer system.

9 Claims, 9 Drawing Sheets

REMOTE ACCESS TERMINAL

BACKGROUND OF THE INVENTION

1. Field of the Invention

The present invention relates generally to telecommunications and more particularly to the monitoring and management of a telecommunications network from a centralized location.

2. Related Art

Many industries today have come to depend upon the use of electronic computers for their daily operations. Typically, these computers are connected to one another via computer networks. Computer networks enable the free flow of information between employees and others throughout the geographical province of the business and beyond.

It is often desirable to view information presented from one or more computer systems from a centralized location in order to gain a broad perspective of the data reported by such computer systems (hereinafter referred to as "reporting computer systems"). For example, in the telecommunications industry, reporting computer systems are used to display the status of a large telephone network. Many of these reporting computer systems are found throughout the geographical region of the large telephone network, which may be for example, nationwide. Each reporting computer system is configured to display the status of a particular segment of the large telephone network. Therefore, the status of the entire telephone network is not available on any single reporting computer system, but such status is split up physically and geographically, among the plurality of reporting computer systems nationwide.

It is desirable to view the information from all of the reporting computer systems from a central computer system, simultaneously, so that the status of the entire telephone network can be observed from a single location.

Conventionally, this is accomplished by making use of the computer network by "logging-on" to reporting computer systems from a centralized computer system. Logging-on to a reporting computer system from a centralized computer system enables a user to interface with, and view data from, the reporting computer system, just as if the user logged-on to the reporting computer system directly.

Under this conventional approach, the centralized computer system logs-on to each reporting computer system in a serial fashion. That is, the centralized computer system logs-on to one reporting computer system, retrieves the necessary data, logs-off the reporting computer system, and then logs-on to the next reporting computer system.

The problem with this conventional approach is that it only accesses a single reporting computer system at a time. Also, since the centralized computer system does not maintain a continuous link with all of the reporting computer systems, that data received therefrom quickly becomes outdated. It would be desirable to log-on to all of the reporting computer systems simultaneously, and to continuously maintain links with all of the reporting computer systems, so as to enable a user to view current data from any one or combination of the reporting computer systems.

An alternative conventional approach requires the establishment and maintenance of one centralized computer system for each reporting computer system whose information is sought. For example, twenty centralized computer systems would be required to view twenty reporting computers simultaneously. Each centralized reporting computer system would be logged-on to one of the twenty reporting computer systems. This approach has the advantage of being able to view current data from all reporting computer systems simultaneously, but has the distinct disadvantage of requiring a significant amount of hardware, which in turn requires significant expense, maintenance, space, etc.

A second problem encountered with these conventional approaches is related to the fact that operator interaction is required. Under both conventional approaches, a computer operator must manually log-on to each reporting computer system. Not only is this time-consuming, but it also generally requires security log-on passwords, program access codes, and the like. Such log-on security passwords and program access codes are generally unique to and separately managed by each reporting computer system. Coordination and maintenance of such codes can be costly and time-consuming.

SUMMARY OF THE INVENTION

This invention discloses a process and system for centralized monitoring and control of a telephone network. Centralized monitoring and control is accomplished with the use of computer networks connecting a plurality of reporting computer systems with a centralized computer system. Each reporting computer system monitors and/or controls a portion of a telecommunication company's telephone network. The present invention allows for simultaneous monitoring and/or control of the entire telephone network of any portion thereof from a centralized location.

The centralized computer system maintains continuous and simultaneous links with the plurality of reporting computer systems via telephone and computer networks. These links enable a user at the centralized computer system to monitor and/or control the plurality of reporting computer systems, each of which monitor and/or control at least a portion of the telephone network.

Features and Advantages

The present invention allows simultaneous and continuous access to a plurality of remote reporting systems from a centralized computer system.

Further, the present invention allows simultaneous and continuous access to a plurality of remote reporting systems from a centralized computer system that is cost-efficient in terms of hardware, software and implementation.

Still further, the present invention permits simultaneous and continuous access to a plurality of remote reporting systems from a centralized computer system that requires a minimum of operator interaction.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
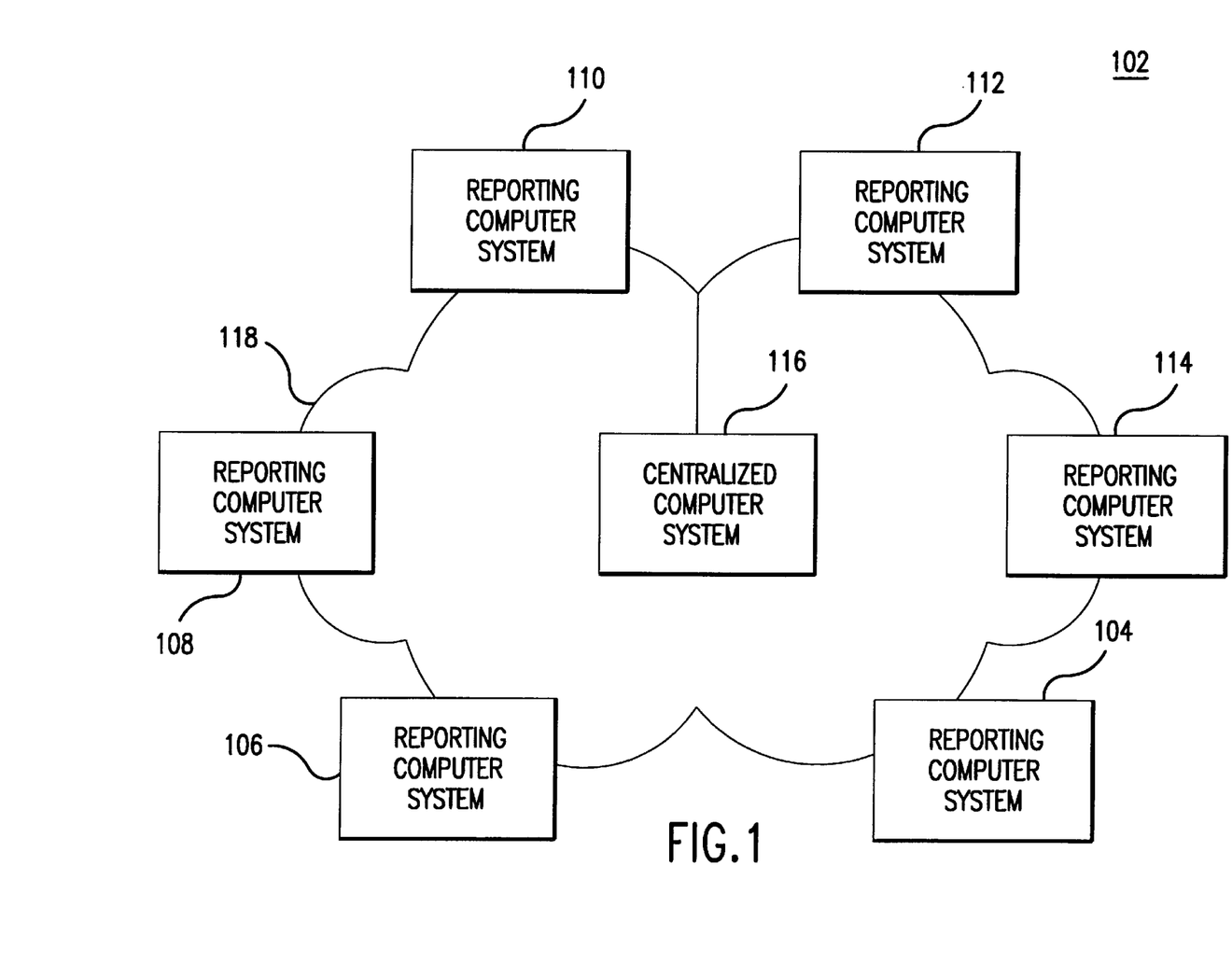
FIG. 1 is block diagram of a data processing system according to an embodiment of the present invention.

FIG. 1 is a block diagram of a data processing system 102 according to an embodiment of the present invention. The data processing system 102 includes a number of reporting computer systems 104–114 and a centralized computer system 116, each connected to a computer network 118.

The present invention provides for the centralized and simultaneous control and/or monitoring of the reporting computer systems 104–114 by the centralized computer system 116. The reporting computer systems 104–114 are typically located in various remote locations throughout a geographical region. The size of the geographical region could be within the confines a single building, throughout an entire country, or world wide. The geographical region is limited only by the size of the computer network 118.

Figure 3:
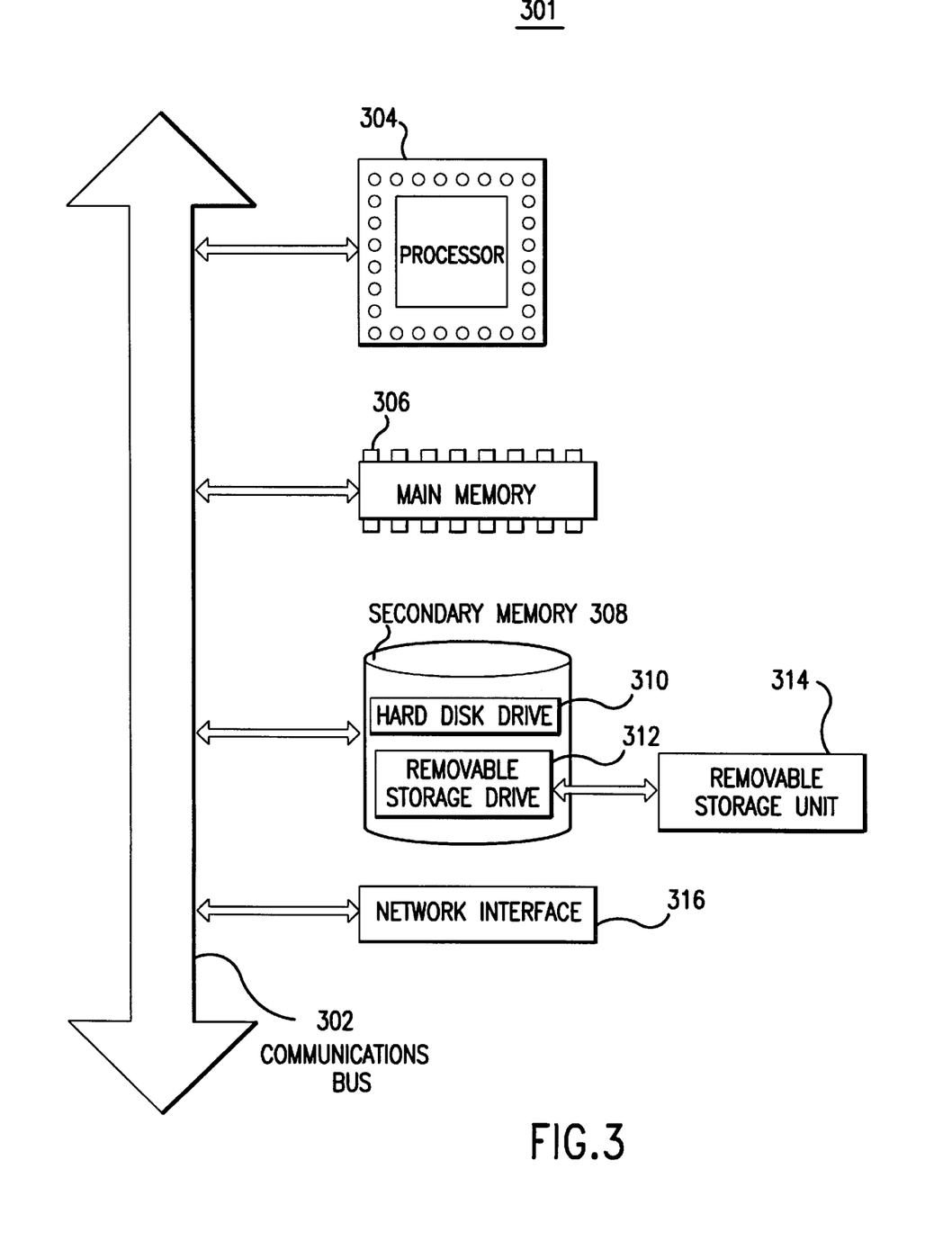
FIG. 3 is a block diagram of a computer useful for implementing components of the present invention.

In one embodiment, the centralized computer system 116 and/or the reporting computer systems 104–114 may be each embodied in a general computer system. An exemplary computer system 301 is shown in FIG. 3. The computer system 301 includes one or more processors, such as processor 304. The processor 304 is connected to a communication bus 302.

The computer system 301 also includes main memory 306, preferably random access memory (RAM), and a secondary memory 308. The secondary memory 308 includes, for example, a hard disk drive 310 and/or a removable storage drive 312, representing a floppy disk drive, a magnetic tape drive, a compact disk drive, etc. The removable storage drive 312 reads from and/or writes to a removable storage unit 314 in a well known manner.

Removable storage unit 314, also called a program storage device or a computer program product, represents a floppy disk, magnetic tape, compact disk, etc. As will be appreciated, the removable storage unit 314 includes a computer usable storage medium having stored therein computer software and/or data.

The computer system 304 also includes a network interface 316 which provides for communication via the computer network 118 as discussed herein. Computer programs (also called controllers) are stored in main memory and/or the secondary memory 308. Such computer programs, when executed, enable the computer system 301 to perform the features of the present invention discussed herein. In particular, the computer programs, when executed enable the processor 304 to perform the features of the present invention. Accordingly, such computer programs represent controllers of the computer system 301.

In another embodiment, the invention is directed to a computer program product comprising a computer readable medium having control logic (computer software) stored therein. The control logic, when executed by processor 304, causes the processor 304 to perform the functions of the invention as described herein.

Figure 2:
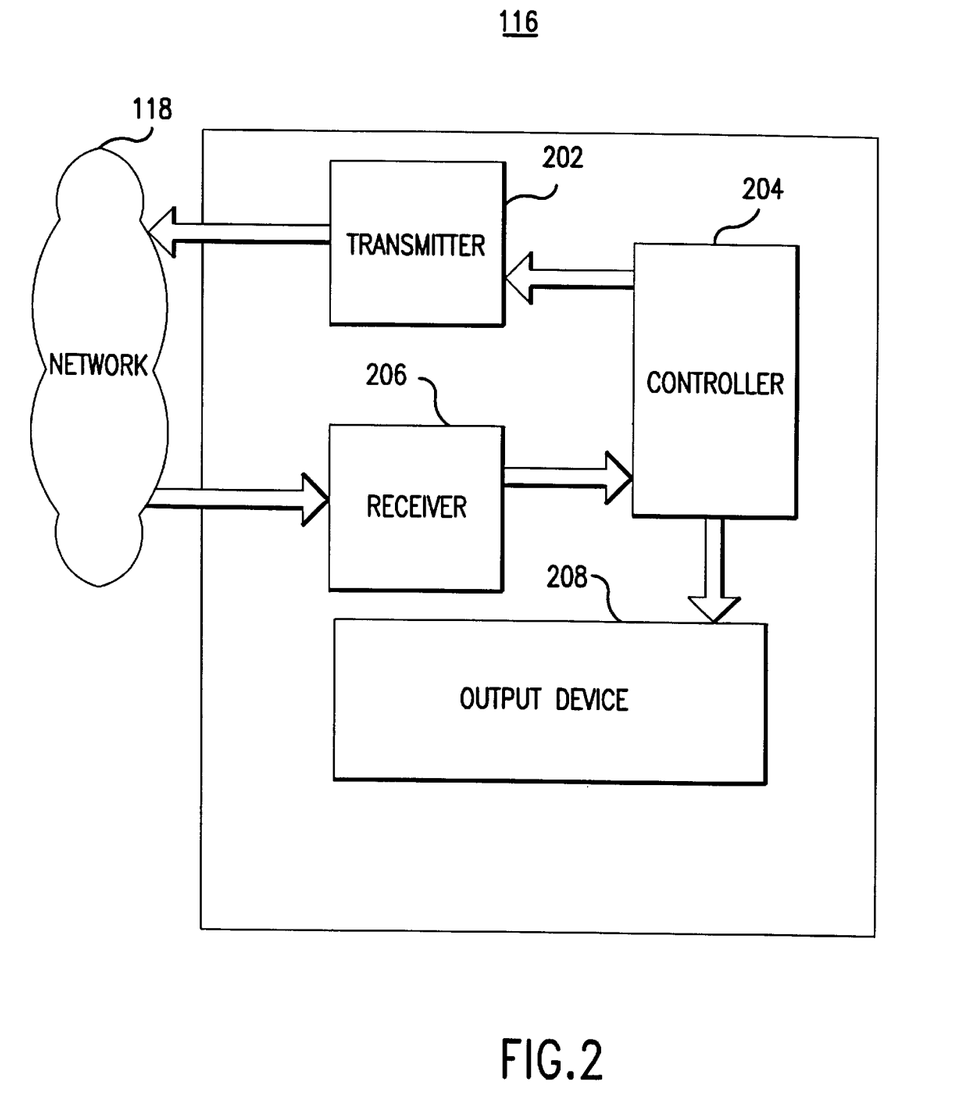
FIG. 2 is a block diagram of a centralized computer system according to an embodiment of the present invention.

Referring to FIG. 2, the centralized computer system 116 preferably includes a transmitter 202, a controller 204, a receiver 206, and an output device 208. The transmitter 202, controller 204, and receiver 206 preferably represent functional blocks of a computer program being executed in the processor 304. The output device 208 represents a display device connected to the bus 302. Generally, the controller 204 instructs the transmitter 202 to transmit information over the computer network 118. The receiver 206 receives information from the computer network 118 and notifies the controller 204 that such information has been received and is ready for inspection.

The controller 204 inspects and processes such information and, if appropriate, presents the information to users on the output device 208.

Figure 4:
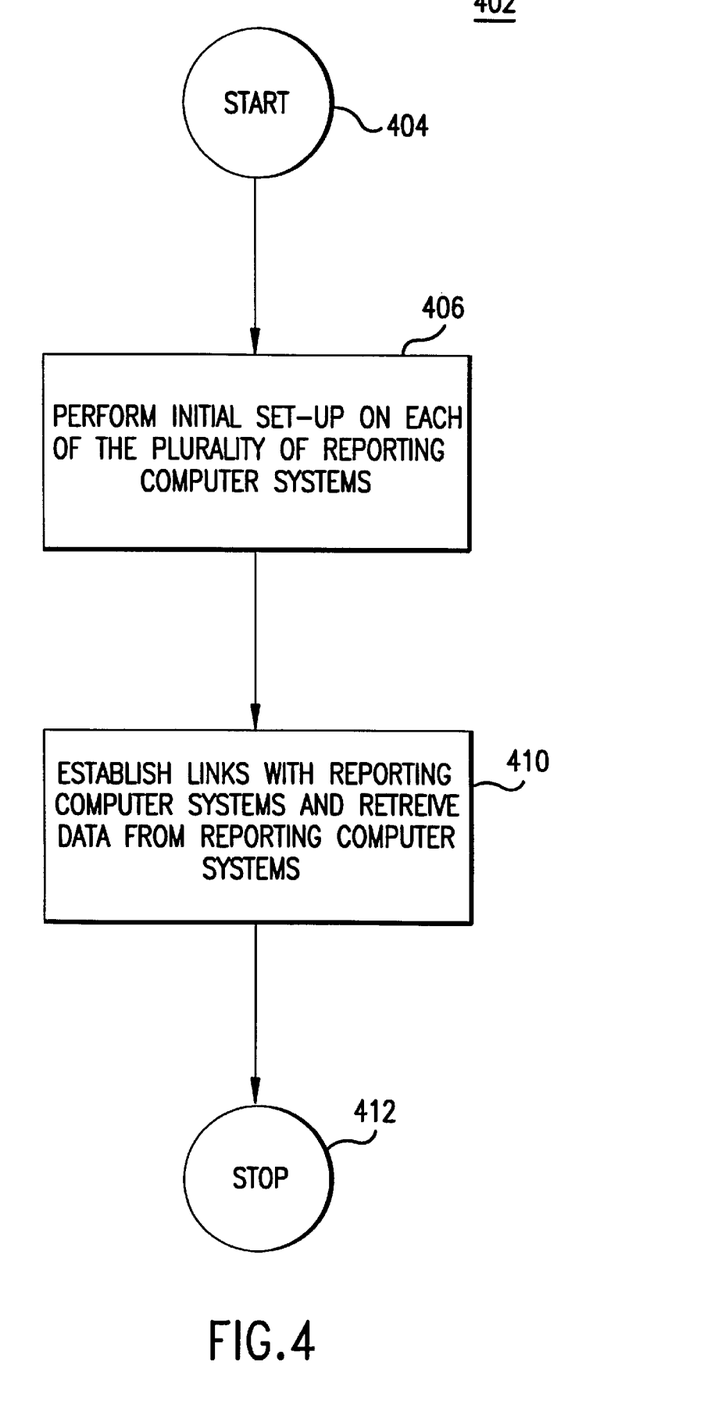
FIGS. 4, 5, and 7 are flowcharts depicting the preferred operation of the present invention.

The operation of the present invention shall now be discussed with reference to a flowchart 402 in FIG. 4. Flowchart 402 begins with step 404, where control immediately passes to step 406. In step 406, an initial set-up is performed on each reporting computer system 104–114. This set-up enables the centralized computer system 116 to log-on to and retrieve data from the reporting computer systems 104–114.

In step 410, the centralized computer system 116 establishes links with the reporting computer systems 104–114, and retrieves data from the reporting computer systems 104–114. These links are simultaneously active and continuously maintained. Steps 406 and 410 are discussed in greater detail below.

Before describing steps 406 and 410 in greater detail, it would be helpful to describe some terms and concepts applicable to the invention and used herein. Such terms and concepts are described in order to fully disclose the present invention and the preferred embodiment thereof, and should not be construed to limit the scope of the present invention.

Establishing communications between the centralized computer system 116 and the reporting computer systems 104–114 as discussed herein, is a two-part process. The first part is hereinafter referred to as "establishing a link". Establishing a link is specific to the hardware and software of a particular computer network, for example computer network 118.

Establishing a link between the centralized computer system 116 and the reporting computer systems 104–114 as discussed herein, is initiated by a command from the centralized computer system 116. The initiating command includes a network address of a particular reporting computer system, for example reporting computer system 106. Typically, the computer network includes a computer network management system, generally software, which manages the computer network 118 and operates in a well known manner. The computer network management system determines if the reporting computer system 106 is properly attached to the computer network 118 and ready to accept messages therefrom. If so, a link is established which enables subsequent communications between the centralized computer system 116 and reporting computer system 106.

In general, the network address is used to identify particular network elements by the computer network management system. For instance, using the example above, the initiating command sent from the centralized computer system 116 includes the network address of the reporting computer system 106 in order to identify it as the intended recipient to the computer network management system. The actual addressing mechanism used is specific to the particular computer network hardware, network management software, network protocol, etc. The method of network addressing however, will be apparent to persons skilled in the pertinent art(s).

The second part of establishing communications as discussed herein, is referred to as logging-on (also called logging-in, log-on, log-in, etc). This process permits a user at the centralized computer system 116 to interact with one of the reporting computer systems 104–114. For example, once the centralized computer system 116 is logged-in to a reporting computer system 104–114, users at the centralized computer system 116 may view screen data that is displayed at the reporting computer system 104–114.

Likewise, once the centralized computer system 116 is logged-in to a reporting computer system 104–114, users at the centralized computer system 116 may provide input to the reporting computer system 104–114 via input devices attached to the centralized computor system 116.

Figure 5:
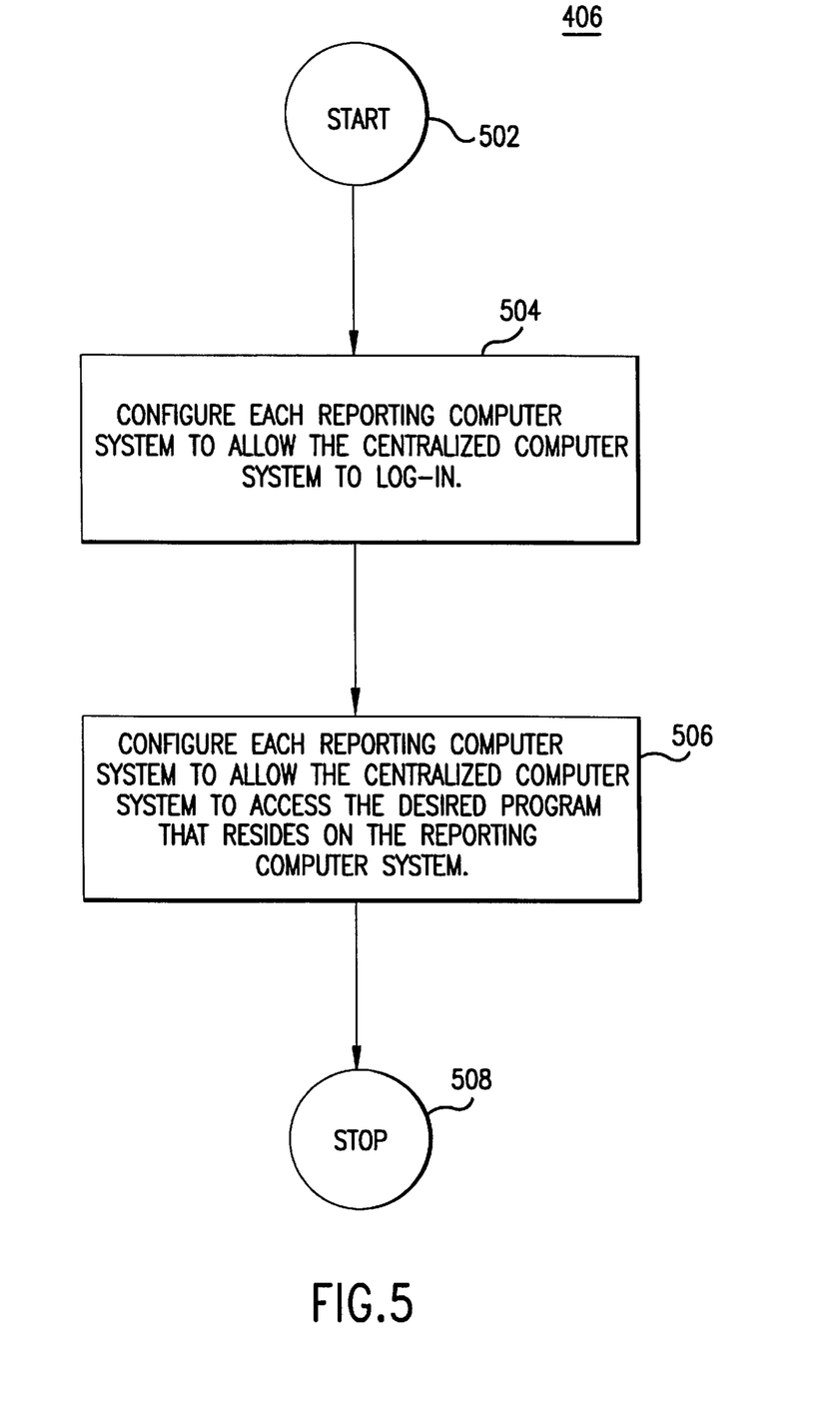

The manner in which step 406 is performed shall now be described with reference to a flowchart in FIG. 5. In step 504 each reporting computer system 104–114 is configured to permit the centralized computer system 116 to log-on to each reporting computer system 104–114.

This generally involves setting up user access rights based on the user account number of the centralized computer system 116. User access rights are generally managed by a network system administrator or the like. Management and control of such rights are specific to the particular network hardware, network management software, network protocol, operating systems, etc. The particular method of establishing user access rights, however, will be apparent to persons skilled in the pertinent art(s).

In step 506 each reporting computer system 104–114 is configured to permit the centralized computer system 116 to access particular application programs and/or particular data that exists on each reporting computer system 104–114.

Step 506 is similar to step 504, in that both steps involve setting up user access rights on each reporting computer system 104–114 on behalf of the centralized computer system 116. However, step 504 pertains to setting up permission to log-on to each reporting computer systems 104–114. Step 506, on the other hand, pertains to setting up permission to execute particular application programs or access particular data that exists on each reporting computer system 104–114.

Such rights are specific to a particular application program and/or data in which access is required by the centralized computer system 116. Some application programs and/or data accesses do not require security measures at all, in which case step 504 becomes unnecessary. However, such access rights and the management and set-up of such rights will be apparent to persons skilled in the pertinent art(s).

Figure 6:
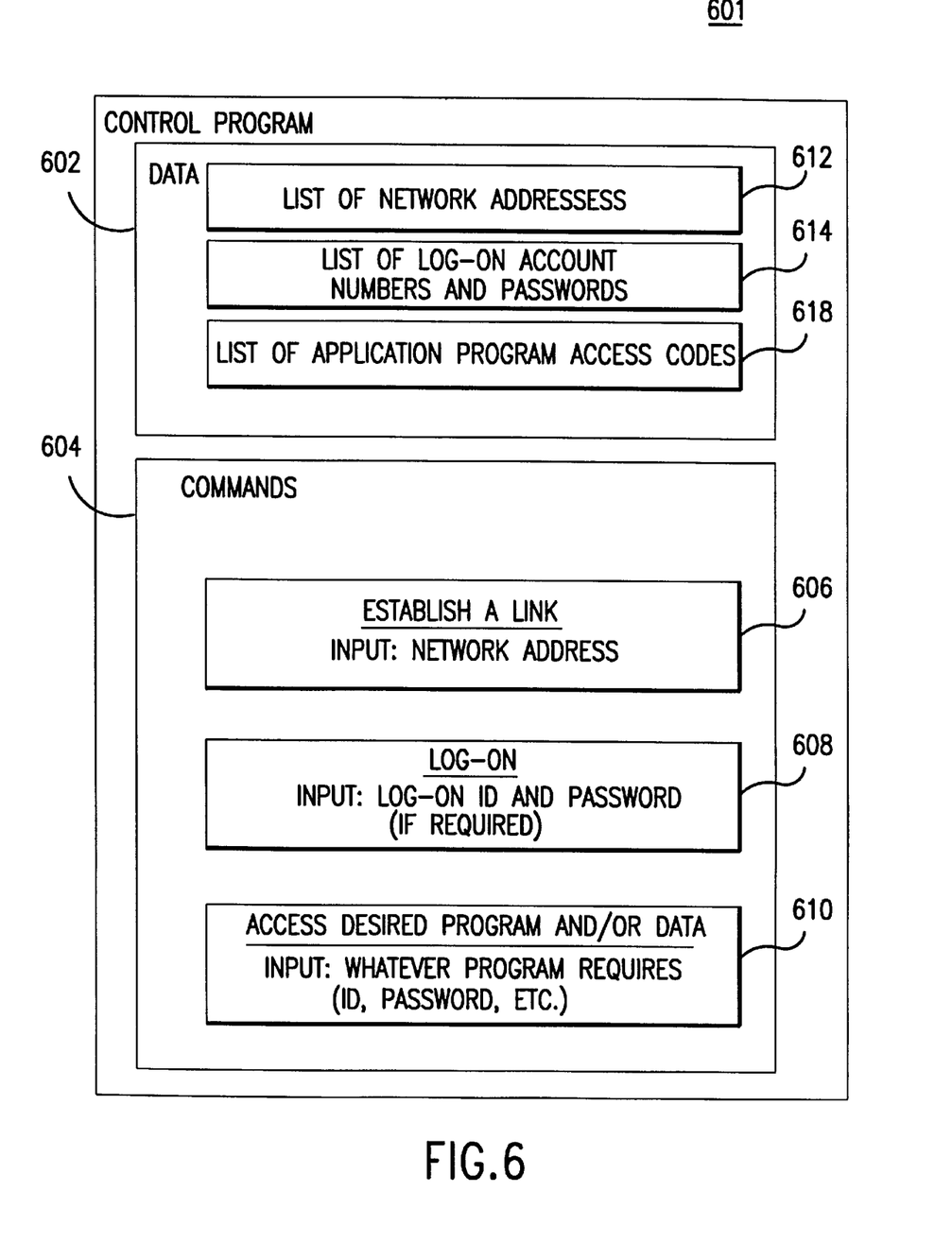
FIG. 6 is a block diagram of a control program of the present invention.

Preferably, the operation of the centralized computer system 116 as discussed herein, is achieved by the execution of a control program 601 (corresponding to the controller 204 executing in the computer 301). FIG. 6 is a block diagram of the control program 601. The control program 601 includes a data portion 602 and a commands portion 604. The data portion 602 includes data pertaining to the reporting computer systems 104–114 that are to be monitored and/or controlled according to the present invention. The data portion 602 typically contains three components for each of the reporting computer systems 104–114 that are to be operated upon, including a list network addresses 612, a list of log-on account numbers and passwords 614 (if required), and a list of application program and/or data access codes 618 (if required). All three of these concepts have been discussed herein and are readily apparent to persons skilled in the pertinent art(s).

The commands portion 604 of the control program 601 includes specific commands that when executed, establish a continuous communication link with each of the reporting computer systems 104–114 that are to be operated upon according to the present invention. The commands portion 604 includes commands that establish a link 606, log-on 608, and access the desired application program and/or data 610. As previously discussed herein, the composition and structure of the commands 604 are very specific to the computer network (hardware, management software, and protocol), the operating system(s) running on the centralized computer system 116 and each reporting computer system 104–114, and the desired application program and/or data. The composition and structure of the commands 604 however, would be apparent to persons skilled in the pertinent art(s).

Figure 7:
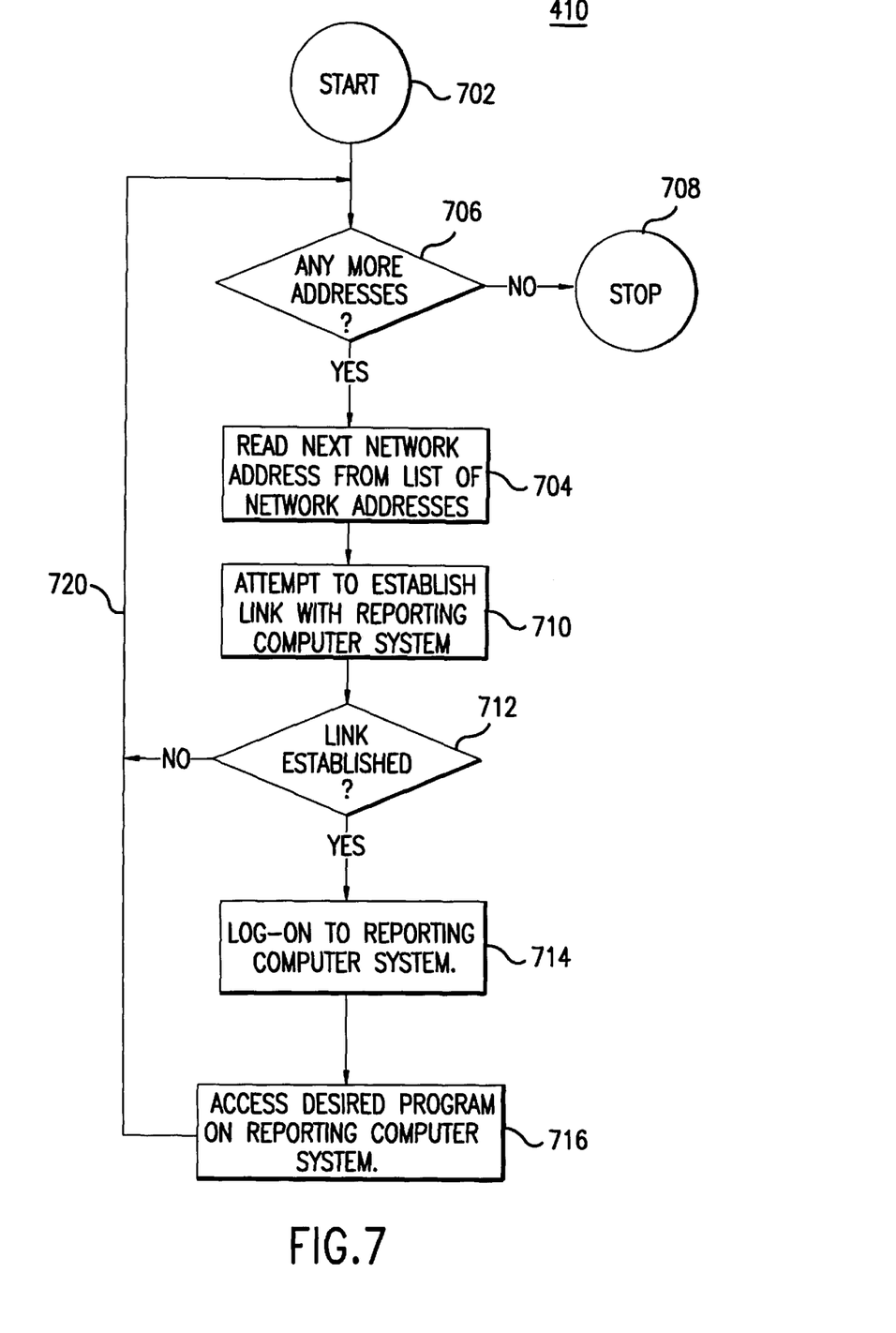

The manner in which step 410 is performed shall now be described with reference to a flowchart in FIG. 7. This flowchart represents the operation of the control program 601 when executed in the computer 301. Flowchart 410 begins with step 702, where control immediately passes to step 706. In step 706, the centralized computer system 116 determines whether any more network addresses appear in the list 612 for processing. If no additional network addresses remain for processing, then the flowchart is complete as indicated by step 708. Otherwise, step 704 is performed. In step 704, a network address is read from the list of network addresses 612.

In step 710 the centralized computer system 116 attempts to establish a link between the centralized computer system 116 and a reporting computer system 104–114 whose address matches the address read in step 704. This is accomplished by executing the link establishment commands 606. In step 712 the centralized computer system 116 determines whether a link was established as a result of step 710. If a link was not established, an error condition has occurred and steps 714–716 are not processed but instead step 706 is reprocessed. If a link was established as a result of step 710, then step 714 is processed. In step 714, the centralized computer system 116 executes the log-on commands 608 to establish a log-on condition between the centralized computer system 116 and the reporting computer system that was linked in step 710. In step 716, the centralized computer system executes the access commands 610 to access the desired application program and/or data on the reporting computer system that has been logged-on in step 714.

Next step 706 is re-executed and the process continues until each address in the list of addresses 612 has been processed as previously discussed. Preferably, the control program 601 is executed automatically, requiring little or no operator interaction. This is accomplished by allowing the centralized computer system 116 to log-on to each reporting computer system 104–114 without requiring a security password. Alternatively, if such security passwords are required, they are included in the data portion 602 of the control program 601. This permits automatic and unattended execution of the control program 601, and reduces password and security management by users of the centralized computer 116, thereby increasing the cost efficiency of the present invention. However, each implementation of the present invention will be unique and such decisions and set-up techniques should be considered on a case by case basis taking into account reasonable security measures and data requirements.

Figure 8:
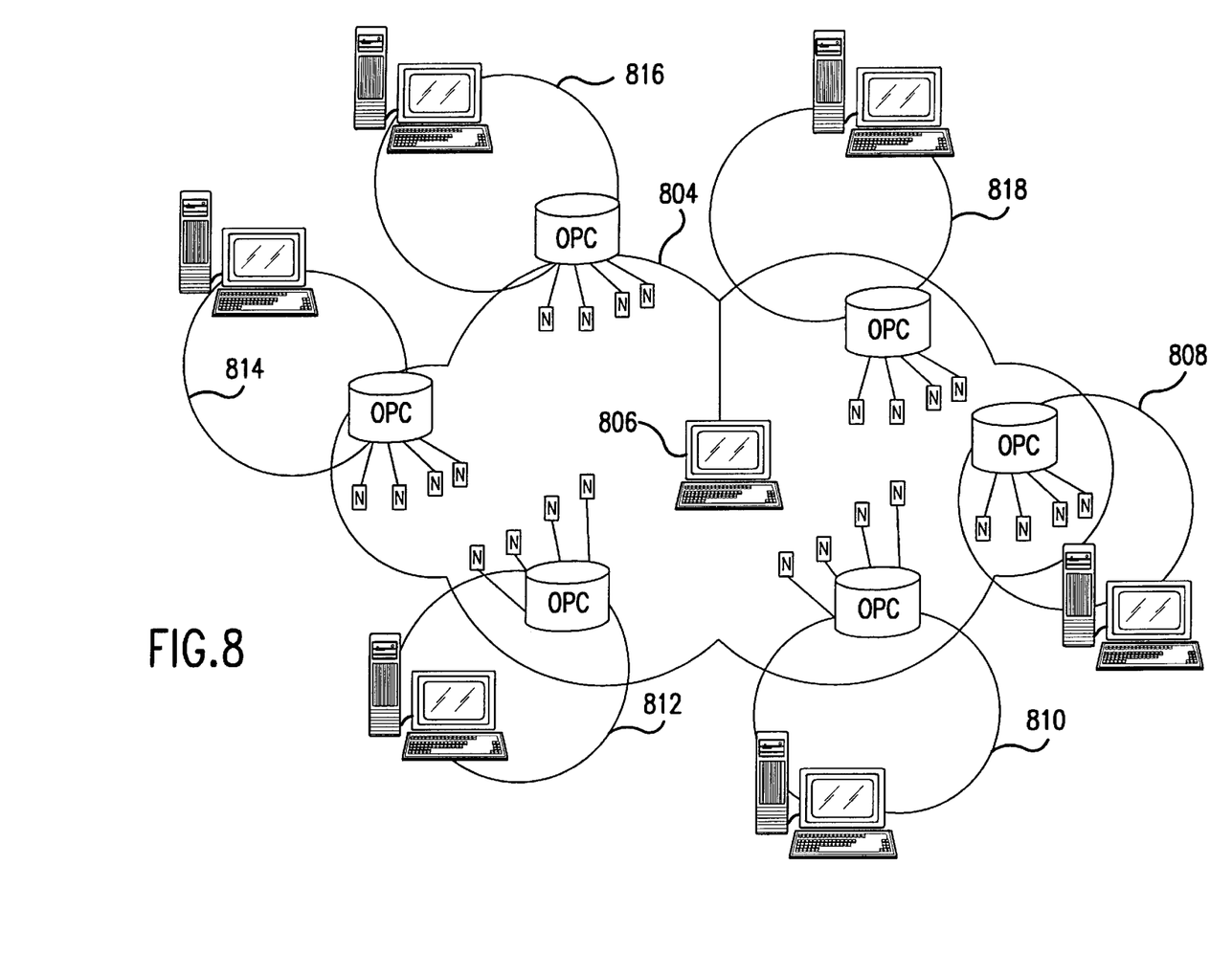
FIG. 8 is block diagram of a data processing system according to an embodiment of the present invention.

A more particular example of an embodiment of the present invention will now be discussed. Referring to FIG. 8, centralized computer system 116 is represented by a computer work station 806. Computer network 118 is at least partially represented by telephone network 804. Reporting computer systems 104–114 are represented by reporting computer environments 808–818. Each reporting computer environment 808–818 is alike and is represented by several elements as depicted in FIG. 9.

Figure 9:
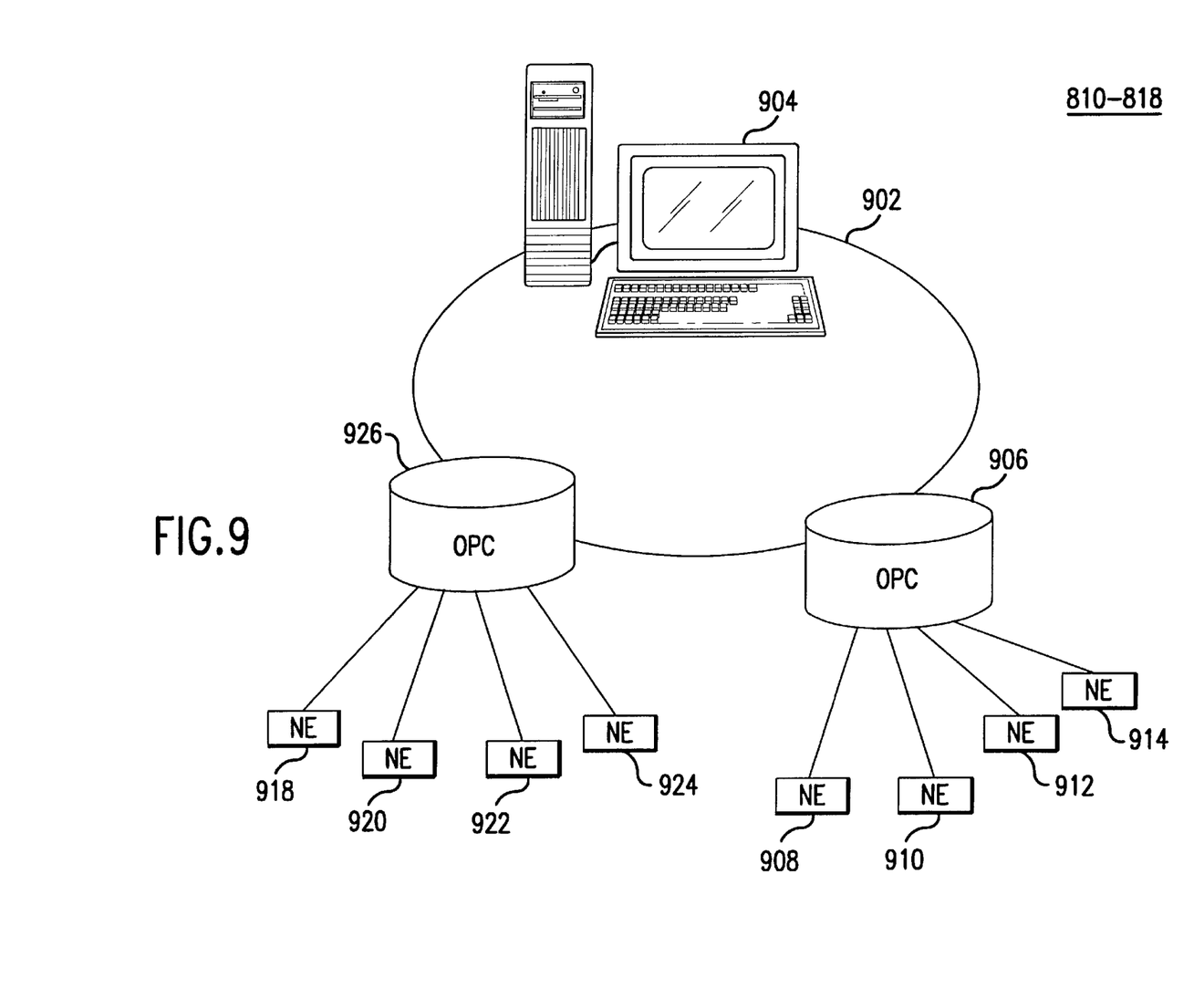
FIG. 9 is b lock diagram of a reporting computer environment according to an embodiment of the present invention.

Referring now to FIG. 9, each reporting computer environment 808–818 is comprised of the following elements. A reporting computer workstation 904 is connected to at least one operations controller (OPC) 906 and 926, via a local area network WAN) 902. The OPCs 906 and 926 are comprised of a generalized computer system, for example computer system 301, which includes a data base. Each OPC 906 and 926 is connected to at least one telephone network element(s) 908–924.

The network elements 908–924 are physical elements of the telephone network 804 such as transmission lines, telecommunication switches, etc. The OPCs 906 and 926 collect data pertaining to the performance and function of the telephone network 804 by monitoring the network elements 908–924. The data collected by the OPCs 906 and 926 can be performance data and/or alarm data, for example. Alarm data is information reported by the OPCs 906 and 926 that exceed certain threshold limits that are programmed into the OPCs 906 and 926 by telephone network engineers or the like.

A single reporting computer workstation 904 reports and displays information pertaining to all the network elements 908–924 that are locally connected to the OPCs 906 and 926 and the reporting computer workstation 904, via the LAN 902. A network manager application program is run on the reporting computer workstation 904 to perform this task.

As can be seen in FIG. 8, a plurality of reporting computer environments 808–818 are connected to telephone network 804. Each reporting computer environment 808–818 only reports data that pertains to a particular segment of the telephone network 804. The particular segment is defined by the network elements 908–924 (for example), that are connected to the OPCs 906 and 926 (for example), which are locally connected to a reporting computer workstation 904 (for example) via a local area network 902 (for example).

The present invention permits central monitoring and/or control of the entire telephone network 804 from a central computer workstation 806. A user at the centralized workstation 806 is simultaneously and continuously logged-on to each of the reporting computer workstations 904 (for example) via the computer network 118 according to the present invention. The computer network 118 is represented by telephone network 804 and a plurality of local area networks 902 (for example), according to an embodiment of the present invention. Other computer network devices such as routers are excluded from the figures and the discussion herein for simplicity, but would be apparent to persons skilled in the pertinent art(s). Communications that extend beyond a particular LAN 902 (for example), is transmitted via the telephone network 804. Such communications may be referred to as wide area network (WAN) communications.

Once the centralized computer workstation 806 has logged-on to one or more of the reporting computer workstations 904 (for example), display data produced by the network manager application programs running on each of reporting computer workstations 904 (for example) is downloaded to the centralized computer workstation 806. Current data at the centralized computer workstation 806 is maintained by downloading from the reporting computer workstation 904 (for example) new data each time a change occurs to the screen data on one or more of the logged-on reporting computer workstations 904 (for example).

At the centralized computer workstation 806, the data from each logged-on reporting computer workstation 904 (for example) is displayed as an icon. Each icon represents the data displayed on the screen at one of the reporting computer workstations 904 (for example). A user at the centralized computer workstation 806 accesses current display data from a particular network manager application program at a particular reporting computer workstation 904 (for example) by selecting a particular icon using a mouse or other input device attached to the centralized workstation 806.

Once a particular icon is selected, display data from that particular reporting computer workstation 904 (for example) is displayed in a moveable and sizeable display window on the display screen of the centralized computer workstation 806. One or more such windows may be displayed simultaneously, thereby enabling simultaneous monitoring of one or more data screens from one or more network manager application programs running on one or more reporting computer workstations. When a particular window is selected by a user, that window becomes the active window. Only one window may be active at any time.

Control signals from input devices directly connected to the centralized computer workstation 806 are sent to the particular reporting computer workstation 904 (for example), whose window is currently active on the display screen of the centralized computer workstation 806. Centralized control of the telephone network is achieved in this manner. Telephone network control features that are possible to perform at the reporting computer workstations 904 (for example) may also be performed at the centralized computer workstation 804. For example, a command to execute a diagnostic utility may be sent from the centralized computer workstation 804 to any of the reporting computer workstations. Upon receiving this commnand, the reporting computer workstation will execute the utility. In a similar manner, the centralized computer workstation 804 can cause any reporting computer workstation 904 (for example) to execute any program resident at that reporting computer workstation.

In a particular embodiment of the present invention, both the reporting computer systems 104–114 and the centralized computer system 116 run on the UNIX operating system. The application program that is running on each reporting computer system 104–114 is a well known telephone network management program called Network Manager™ available from Nortel Incorporated. The program Network Manager™ runs on an Hewlett-Packard 735 workstation and provides for remote X-windows as well as local X-windows access. The present invention may be implemented using a window management program such as Motif™ which is widely available and by making use of well known functions of the UNIX operating system such as remote log-on and remote shell commands.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A process for centralized monitoring of a telephone network comprising a centralized computer system and a plurality of reporting computer systems connected to a computer network, said process comprising the steps of:

performing initial set-up on each of the reporting computer systems by configuring each of the reporting computer systems to allow the centralized computer system to log-on and to access programs residing in each of the reporting computer systems;

establishing communications links between the centralized computer system and each of the reporting computer systems;

logging-on to each of the reporting computer systems from the centralized computer system;

simultaneously and continuously maintaining said communications links between the centralized computer system and each of the plurality of reporting computer systems, wherein the centralized computer system is simultaneously and continuously logged-on to each of the plurality of reporting computer systems via said communications links;

transmitting, via said links, telephone network management status information from each of the plurality of reporting computer systems to the centralized computer system;

receiving at the centralized computer system the telephone network management status information from the plurality of reporting computer systems;

enabling a user at the centralized computer system to display the telephone network management status information from any one of the plurality of reporting computer systems; and enabling the user at the centralized computer system to perform any telephone network control feature that can be performed at any of the plurality of reporting computer systems, including the steps of:

at the centralized computer system, accepting input data directed to a particular reporting computer system via an input device connected to the centralized computer system;

transmitting said input data to the particular reporting computer system;

at the particular reporting computer system, receiving said input data; and at the particular reporting computer system, processing said input data.

2. The process of claim 1, wherein said step of enabling a user at the centralized computer system to display the telephone network management status information includes the step of presenting the telephone network status information on a display device as a plurality of icons, whereby each icon represents data received from one of the plurality of reporting computer systems, said process further comprising the steps of:

enabling a user to select an icon from among the plurality of icons displayed on the display device of the centralized computer system; and displaying to the user the current telephone network status information from the particular reporting computer system represented by the selected icon.

3. The process of claim 1, wherein said establishing step, said logging-on step, said maintaining step, said transmitting step, and said receiving step are processed without any user interaction.

4. The process of claim 3, wherein said establishing step, said logging-on step, said maintaining step, said transmitting step, and said receiving step are implemented as a computer program that is executed as a background process on the centralized computer system and the plurality of reporting computer systems.

5. A telecommunications system, comprising:

a telephone network comprising at least one computer network;

a centralized computer system connected to said at least one computer network;

a plurality of reporting computer systems each connected to said telephone network and said at least one computer network, each of said plurality of reporting computer systems comprising network management means for monitoring a portion of said telephone network, and for obtaining network status information pertaining to said portion of said telephone network;

said centralized computer system comprising:

logging-on means for logging-on to said reporting computer systems to thereby establish continuous communications links with said reporting computer systems;

means for simultaneous maintaining said continuous communications links with said reporting computer systems;

means for causing said reporting computer systems to transfer said network status information to said centralized computer systems via said continuous communications links;

displaying means for enabling a user to display said network status information from any of said reporting computer systems; and controlling means for enabling the user at the centralized computer system to perform any telephone network control feature that can be performed at any of the plurality of reporting computer systems.

6. The system of claim 5, whereby each said reporting computer system further comprises:

network management means for controlling said portion of said telephone network;

receiving means for receiving commands from said centralized computer system via said continuous communications links; and means for processing said commands, so as to enable said controlling means of said centralized computer system to remotely control said portion of said telephone network.

7. A computer program product, comprising a computer useable medium having computer program logic stored therein, said computer program logic for enabling a centralized computer and a plurality of reporting computers to perform centralized monitoring of a telephone network, wherein said computer program logic comprises:

means for enabling the centralized computer to simultaneously maintain continuous communication links with the plurality of reporting computer systems;

means for enabling the reporting computers to transmit, via said links, telephone network management status information to the centralized computer system;

means for enabling the centralized computer to receive the telephone network management status information from the plurality of reporting computers;

means for enabling the centralized computer to display the telephone network management status information from any one of the plurality of reporting computer systems;

means for enabling the centralized computer to accept input data directed to a particular reporting computer via an input device connected to the centralized computer;

means for enabling the centralized computer to transmit said input data to the particular reporting computer;

means for enabling the particular reporting computer to receive said input data;

means for enabling the particular reporting computer to process said input data; and means for enabling the user at the centralized computer system to perform any telephone network control feature that can be performed at any of the plurality of reporting computer systems.

8. The computer program product of claim 7, wherein said computer program logic further includes:

means for enabling the centralized computer to present the telephone network status information on a display device as a plurality of icons, wherein each icon represents data received from one of the plurality of reporting computer systems.

9. The computer program product of claim 8, wherein said computer program logic further includes:

means for enabling the centralized computer accept from a user, a selected icon from among the plurality of icons displayed on the display device of the centralized computer system; and means for enabling the centralized computer to display to the user the telephone network status information from the particular reporting computer system represented by said selected icon.

* * * * *